United States Patent [19]

Neff et al.

[11] Patent Number: 4,770,210

[45] Date of Patent: Sep. 13, 1988

[54] VALVE MANIFOLD STACKING BASE

[75] Inventors: James A. Neff, Birmingham; Richard A. Fagerlie, West Bloomfield, both of Mich.

[73] Assignee: Mac Valves, Inc., Wixom, Mich.

[21] Appl. No.: 76,793

[22] Filed: Jul. 23, 1987

[51] Int. Cl.⁴ .............................................. F16K 27/00
[52] U.S. Cl. ........................................ 137/884; 251/367
[58] Field of Search ...................... 137/269, 884, 271; 251/267, 266, 367

[56] References Cited

U.S. PATENT DOCUMENTS

| | | | |
|---|---|---|---|
| 3,221,762 | 12/1965 | Chinn | 137/116.5 |
| 3,323,545 | 6/1967 | Curls | 137/884 |
| 3,323,547 | 6/1907 | Van Husen, Jr. et al. | 137/269 X |
| 3,420,257 | 1/1969 | Lansky et al. | 137/116.5 |
| 3,504,704 | 4/1970 | Bechett et al. | 251/367 X |
| 3,513,876 | 5/1970 | Tarbox | 137/596 |
| 3,658,082 | 4/1972 | DiTirro | 137/116.5 |
| 3,926,208 | 12/1975 | Hoffman et al. | 137/484.8 |
| 4,230,143 | 10/1980 | Settman et al. | 137/884 X |
| 4,276,902 | 7/1981 | Roth | 137/505.18 |
| 4,453,565 | 6/1984 | Neff | 137/884 X |
| 4,462,427 | 7/1984 | Neff | 137/625.64 |
| 4,465,100 | 8/1984 | Neff | 137/625.64 |
| 4,491,151 | 1/1985 | Neff | 137/884 X |

Primary Examiner—A. Michael Chambers
Assistant Examiner—John C. Fox
Attorney, Agent, or Firm—Robert G. Mentag

[57] ABSTRACT

A manifold stacking base which may selectively provide an integral flow control function, with or without a pressure regulation function, for a fluid pressure valve system, without the need for a sandwich plate or an interface plate between the base and the valve in said system.

11 Claims, 5 Drawing Sheets

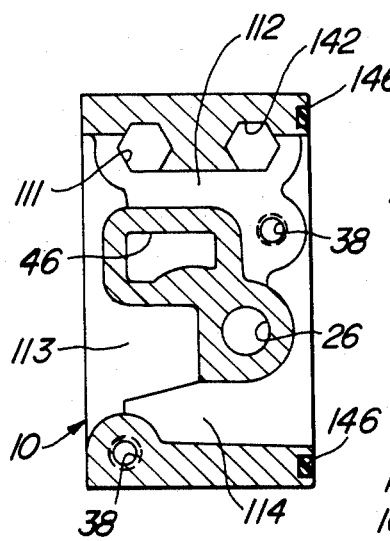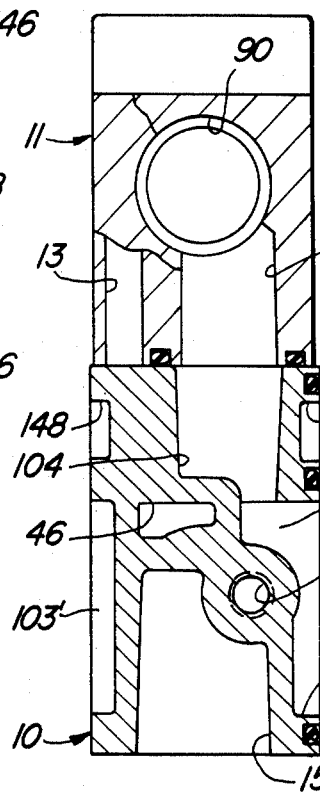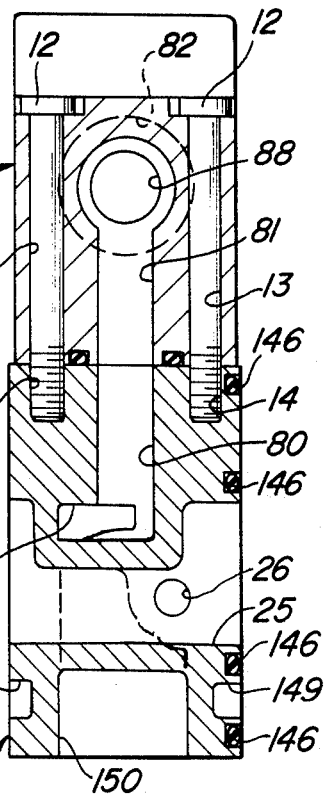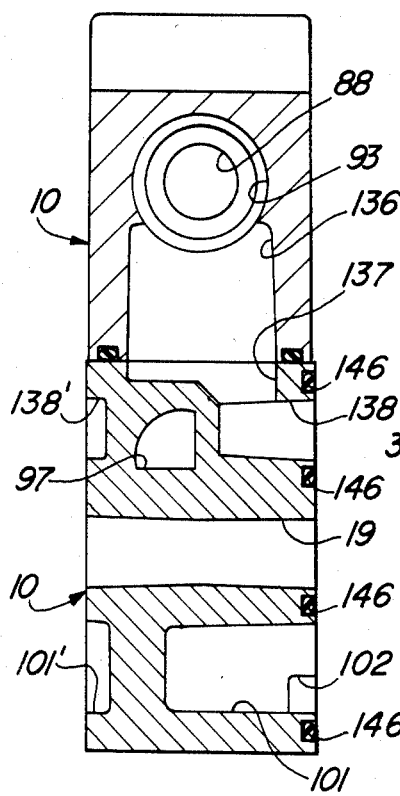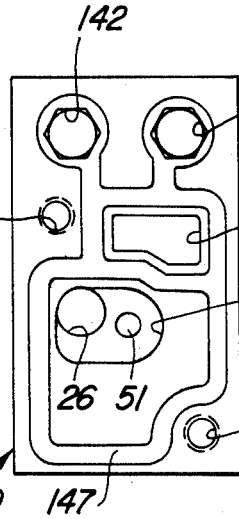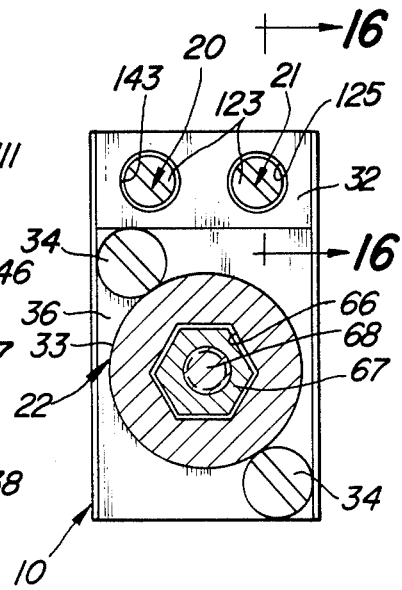

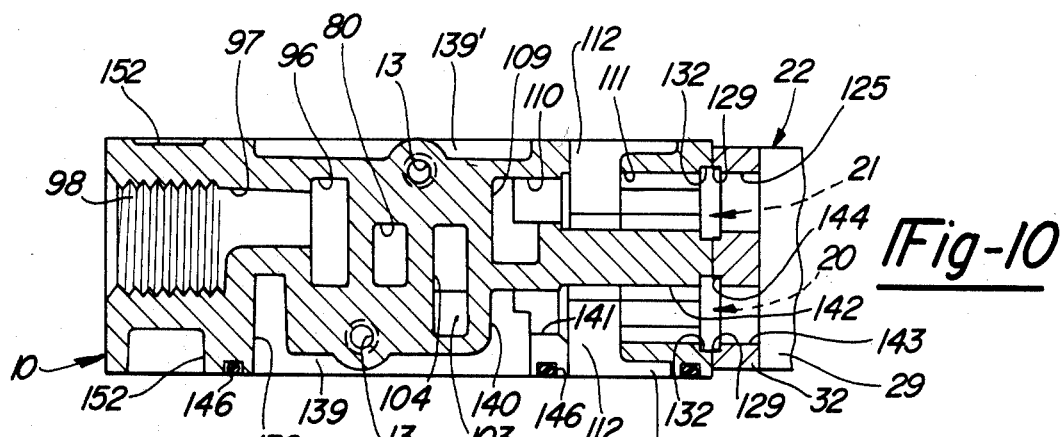
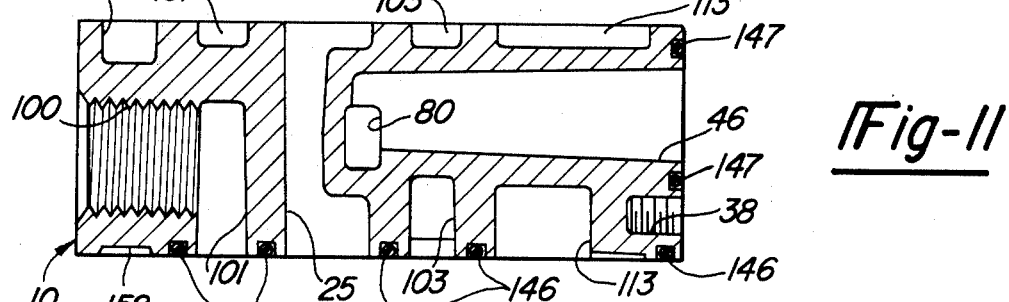
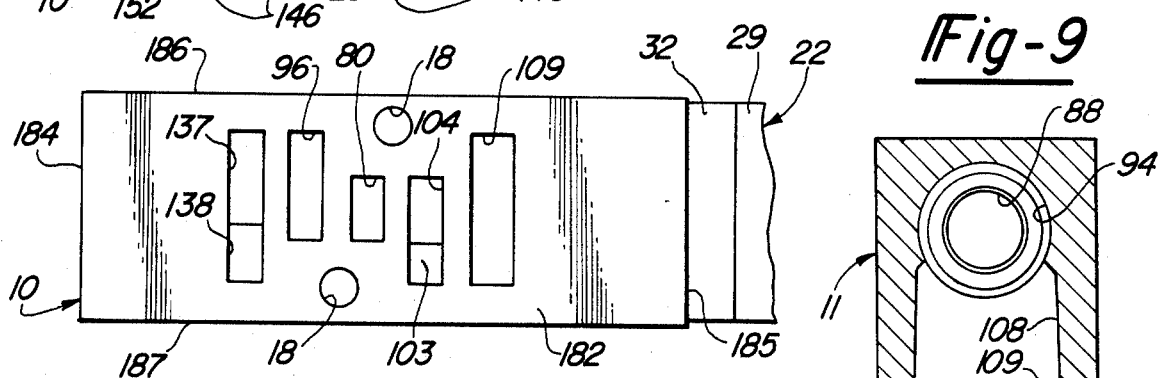
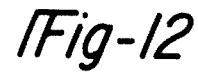
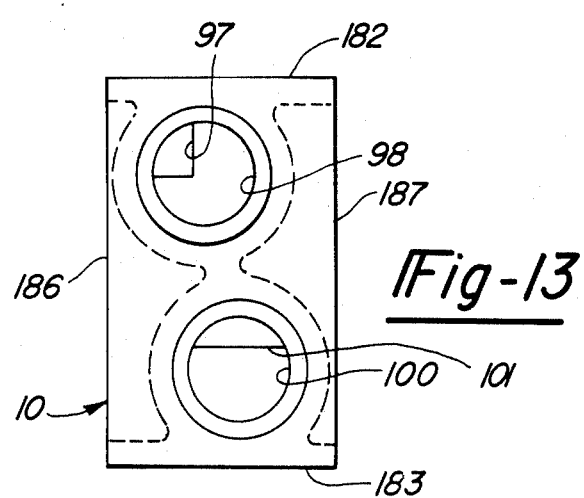
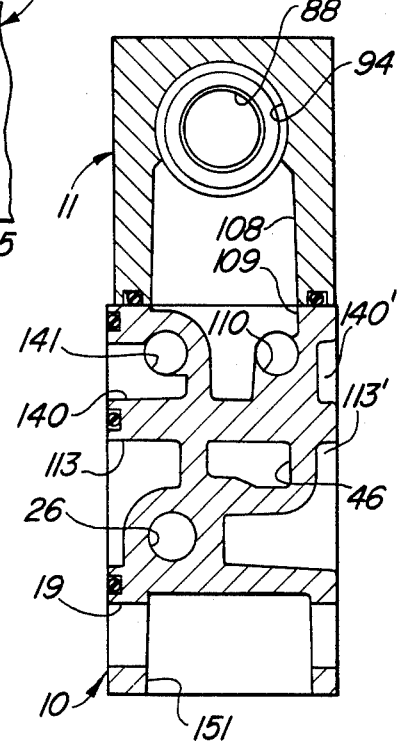

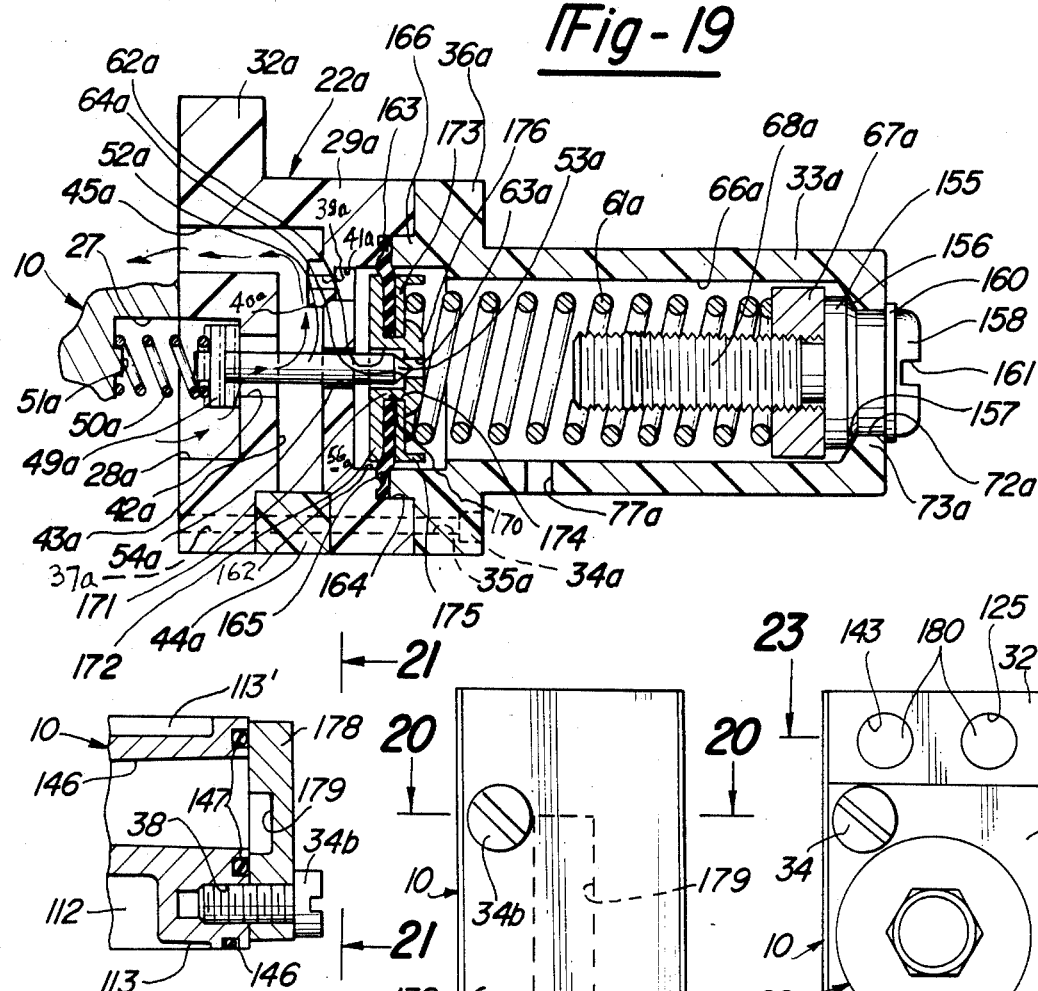

VALVE MANIFOLD STACKING BASE

BACKGROUND OF THE INVENTION

1. Technical Field

The field of art to which this invention pertains may be generally located in the class of devices relating to valves. Class 137, Fluid Handling, United States Patent Office Classification, appears to be the applicable general area of art to which the subject matter similar to this invention has been classified in the past.

2. Background Information

Present day industrial plants employ a variety of machines which are provided with fluid pressure control systems that are operated by air pressure. The fluid pressure control system for such machines vary from machine to machine. Some fluid pressure control systems employ a directional control valve provided with a pressure regulator valve, while other such systems may employ a pressure regulator valve and a flow control valve means with a directional control valve, and still other systems may employ only a flow control valve means with a directional control valve. Heretofore, if a directional control air valve was required in a fluid pressure control system which was to be provided with a pressure regulator valve or a flow control valve means it was necessary to provide a sandwich or interface plate that would be mounted on the directional control valve manifold or base, and the pressure regulator valve and the flow control valve means would be mounted on the sandwich or interface plate. The problem created by the use of sandwich or interface plates, for adding a pressure regulator valve or a flow control valve means to a directional control valve structure, is that such additions enlarge the overall directional control valve structure, increase the cost and weight of the valve structure, and make such structure more complex. The enlargement of a directional control valve structure by the use of such sandwich or interface plates, when employed on a stacking directional control valve, is a disadvantage, because in many instances the directional control valve structure must be mounted in a very small space or area on a machine that it is controlling, as for example, a robotic device. A further disadvantage of the use of sandwich or interface plates for adding a pressure regulator valve or a flow control valve means is that such plates add additional weight to the overall valve structure, which is a disadvantage when the valve must be employed on a robot arm which is moved between many operative positions. A typical example of a prior art directional control valve, which employs sandwich or interface plates for the provision of a pressure regulating function and a flow control function is described and illustrated in the U.S. Pat. No. 3,513,876 to Tarbox.

It is a primary object of the present invention, to provide a novel manifold stacking base which overcomes the problems of increased cost, increased weight and enlarged structures, when it is required to provide pressure regulating and flow control functions with the use of a sandwich plate in a pneumatic control system. It is another object of the present invention to provide a novel manifold stacking base which is light in weight, compact in structure, and which is adapted to selectively provide either both pressure regulating and flow control functions, or neither of said functions. It is a further object of the present invention to further provide a novel manifold stacking base for a directional control valve structure which does not require a sandwich or interface plate in order to provide any required pressure regulating or flow control functions. It is still another object of the present invention, to provide a novel manifold stacking base for a directional control valve structure which provides a low profile valve structure, yet which can be employed to provide pressure regulating and flow control functions.

SUMMARY OF THE INVENTION

The aforegoing objects are accomplished by providing a manifold stacking base which is simple and compact in structure and economical to manufacture. The manifold stacking base of the present invention is provided with a common inlet pressure passage that extends transversely therethrough, for interconnection with an identical common inlet pressure passage in an adjacent manifold stacking base made in accordance with the invention. The manifold stacking base of the present invention is also provided with a common exhaust passage that is adapted to communicate with a similar common exhaust passage in an adjacent manifold stocking base. The manifold stacking base is provided with a pair of cylinder ports which are adapted to communicate through the passages formed in the base with the cylinder chambers in a directional control valve mounted on the base. The common inlet pressure and exhaust passages in a manifold stacking base are adapted to communicate with inlet and exhaust ports, respectively, in a pair of end plates which are mounted on the outer most bases in a stack of said bases. If only a single manifold stacking base is employed in a pneumatic control system then the single base is mounted between a pair of end plates.

The common inlet pressure and exhaust passages in a manifold stacking base communicate through passages formed in the base with the inlet and exhaust chambers, respectively, of a directional control valve carried on the base. The manifold stacking base of the present invention is constructed and arranged so that it may selectively carry, or not carry, one or more flow control valves, for selective controlling of the flow of exhaust air from a directional control valve mounted on the base. The manifold stacking base is also adapted to selectively have, or not have, a pressure regulator valve attached to the base, to supply, or not to supply, a pressure regulating function to the pressurized air being supplied to a control valve mounted on the base. The manifold stacking base of the present invention is light in weight and compact because of the novel arrangement of the various flow passages through the same, and wherein some of the passages are formed partially on the side interfaces of the base which are enclosed by a pair of adjacently stacked identical bases, or a pair of end plates.

The weight of the manifold stacking base is also reduced by providing weight reducing openings along the bottom and sides of the base.

BRIEF DESCRIPTION OF THE DRAWINGS

FIG. 3 is an elevation section view of the manifold stacking base structure illustrated in FIG. 2, taken along the line 3—3 thereof, and looking in the direction of the arrows.

FIG. 4 is an elevation section view of the manifold stacking base and directional control valve structure illustrated in FIG. 2, with the valve spool removed, taken along the line 4—4 of FIG. 2, and looking in the direction of the arrows.

FIG. 5 is an elevation section view of the manifold stacking base and directional control valve structure illustrated in FIG. 2, with the valve spool removed, taken along the line 5—5 of FIG. 2, and looking in the direction of the arrows.

FIG. 6 is an elevation section view of the manifold stacking base and directional control valve structure illustrated in FIG. 2, with the valve spool removed, taken along the line 6—6 of FIG. 2, and looking in the direction of the arrows.

FIG. 7 is an elevation view of the right end of the manifold stacking base illustrated in FIG. 2, taken along the line 7—7 thereof, and looking in the direction of the arrows.

FIG. 8 is an elevation view of the manifold stacking base structure illustrated in FIG. 2, taken along the line 8—8 thereof, and looking in the direction of the arrows.

FIG. 9 is an elevation section view of the manifold stacking base and directional control valve structure shown in FIG. 2, with the valve spool removed, taken along the line 9—9 thereof, and looking in the direction of the arrows.

FIG. 10 is a horizontal section view of the manifold stacking base structure illustrated in FIG. 2, taken along the line 10—10 thereof, with the flow control valves removed, and looking in the direction of the arrows.

FIG. 11 is a horizontal section view of the manifold stacking base structure illustrated in FIG. 2, taken along the line 11—11 thereof, and looking in the direction of the arrows.

FIG. 12 is a top view of the manifold stacking base structure illustrated in FIG. 2, taken along the line 12—12 thereof, and looking in the direction of the arrows.

FIG. 13 is a left end view of the manifold stacking base structure illustrated in FIG. 2, taken along the line 13—13 thereof, and looking in the direction of the arrows.

FIG. 19 is a longitudinal section view of a diaphragm type regulator valve employed in the invention, taken along the line 19—19 of FIG. 1, and looking in the direction of the arrows.

FIG. 20 is a fragmentary, horizontal section view of the manifold stacking base structure illustrated in FIG. 21, taken along the line 20—20, looking in the direction of the arrows, and showing a modification of the invention wherein the manifold stacking base is not provided with any flow control valves or a pressure regulating valve.

FIG. 21 is a right side end elevation view of the manifold stacking base structure illustrated in FIG. 20, taken along the line 21—21 thereof, and looking in the direction of the arrows.

FIG. 22 is a right side end elevation view of a manifold stacking base made in accordance with the principles of the invention, and illustrating a further modification of the invention wherein the manifold stacking base is not provided with any flow control valves, but is provided with a pressure regulator valve.

FIG. 23 is horizontal section view of the structure illustrated in FIG. 22, taken along the line 23—23 thereof, and looking in the direction of the arrows.

FIG. 24 is a fragmentary, right end elevation view of a manifold stacking base made in accordance with the principles of the present invention, and illustrating still a further modification of the invention wherein two flow control valves are employed, but no pressure regulator valve is employed.

FIG. 25 is a side elevation view of the right side end plate, illustrated in FIG. 1, taken in the direction of the arrow marked "24".

DESCRIPTION OF THE PREFERRED EMBODIMENTS

Figure 1:
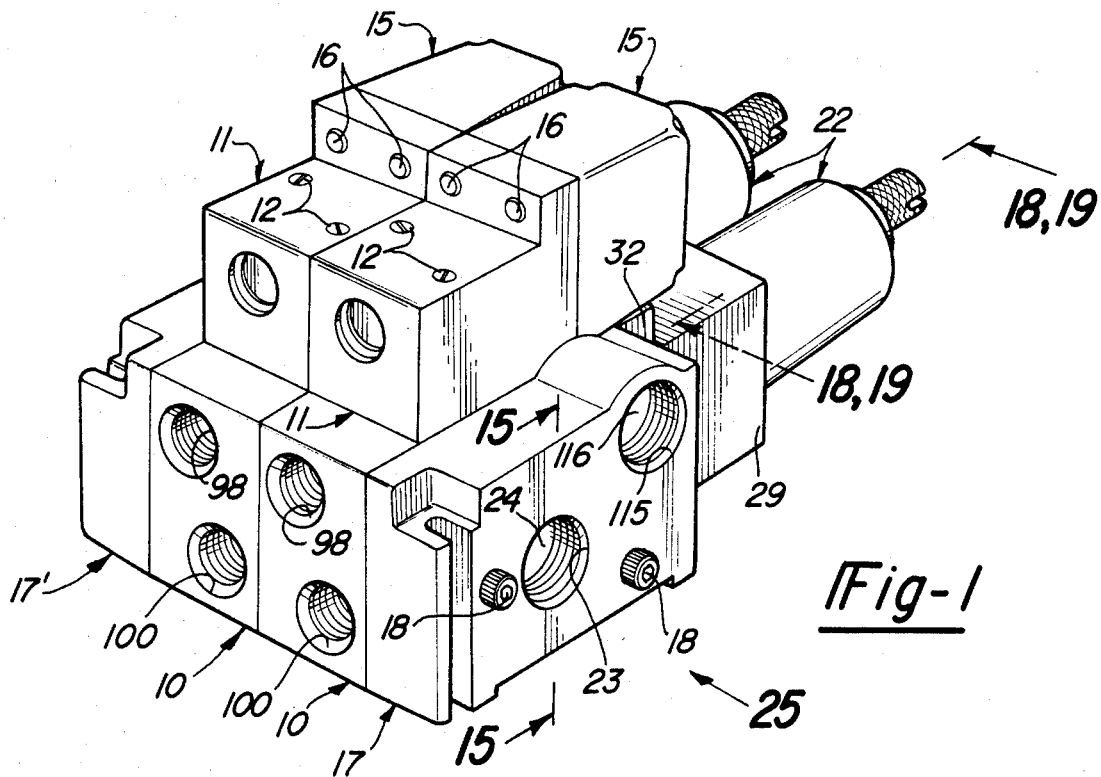
FIG. 1 is a perspective view of two stacking four-way directional control air valves provided with manifold stacking bases made in accordance with the principles of the present invention.

FIG. 1 is perspective view of two stacking, four-way directional control air valves provided with manifold stacking bases made in accordance with the principles of the present invention. The numeral 10 generally designates a manifold stacking base on which is operatively mounted a conventional solenoid operated valve, generally indicated by the numeral 11. Each of the illustrated solenoid operated directional control valves 11 is releasably secured to an individual manifold stacking base 10 by a pair of suitable machine screws 12. As shown in FIG. 5, the valve machine screws 12 extend through bores 13 in each valve and into threaded engagement with threaded holes 14 in the adjacent manifold stacking base 10. Each of the directional control valves 11 is provided with a conventional solenoid, generally indicated by the numeral 15. Each solenoid 15 is operatively connected to one of the directional control valves 11 by a plurality of suitable machine screws 16. The manifold stacking bases 10 are operatively connected together by a right side end plate and a left side end plate, generally indicated by the numerals 17 and 17', respectively. The end plates 17 and 17' are secured to the manifold stacking bases 10 by a pair of suitable tie rods 18, which extend transversely through the manifold stacking bases 10, through suitable tie rod holes 19 (FIGS. 2, 6, and 9), and into operative engagement with suitable nuts on the far side of the structure illustrated in FIG. 1.

The directional control valve 11 does not form any part of the present invention, and for purposes of illustration a four-way poppet valve has been shown, and it is fully described in U.S. Pat. No. 4,574,844. The details and operation of the illustrated four-way poppet valve 11 of said U.S. Pat. No. 4,574,844 are incorporated herein by reference.

FIGS. 1 through 18 illustrate a first modification of the invention, which includes a manifold stacking base 10 provided with a pair of flow control valves, generally indicated by the numerals 20 and 21 in FIG. 8, for controlling the exhaust flow from a directional control valve 11, and a piston type pressure regulator valve 22 (FIG. 18) for controlling the inlet pressure to the directional control valve 11.

Each of the end plates 17 and 17' are similarly constructed, and they are each provided with a supply pressure port 23 which communicates (FIG. 15) with a supply pressure inlet passage 24. In use, the supply pressure ports 23 in both of the end plates 17 and 17' could be connected to a source of air under pressure, or preferably, one of the supply pressure ports 23 would be plugged and all of the valves 11 in a stack of such valves would be supplied through the other one of the supply pressure ports 23.

Figure 2:
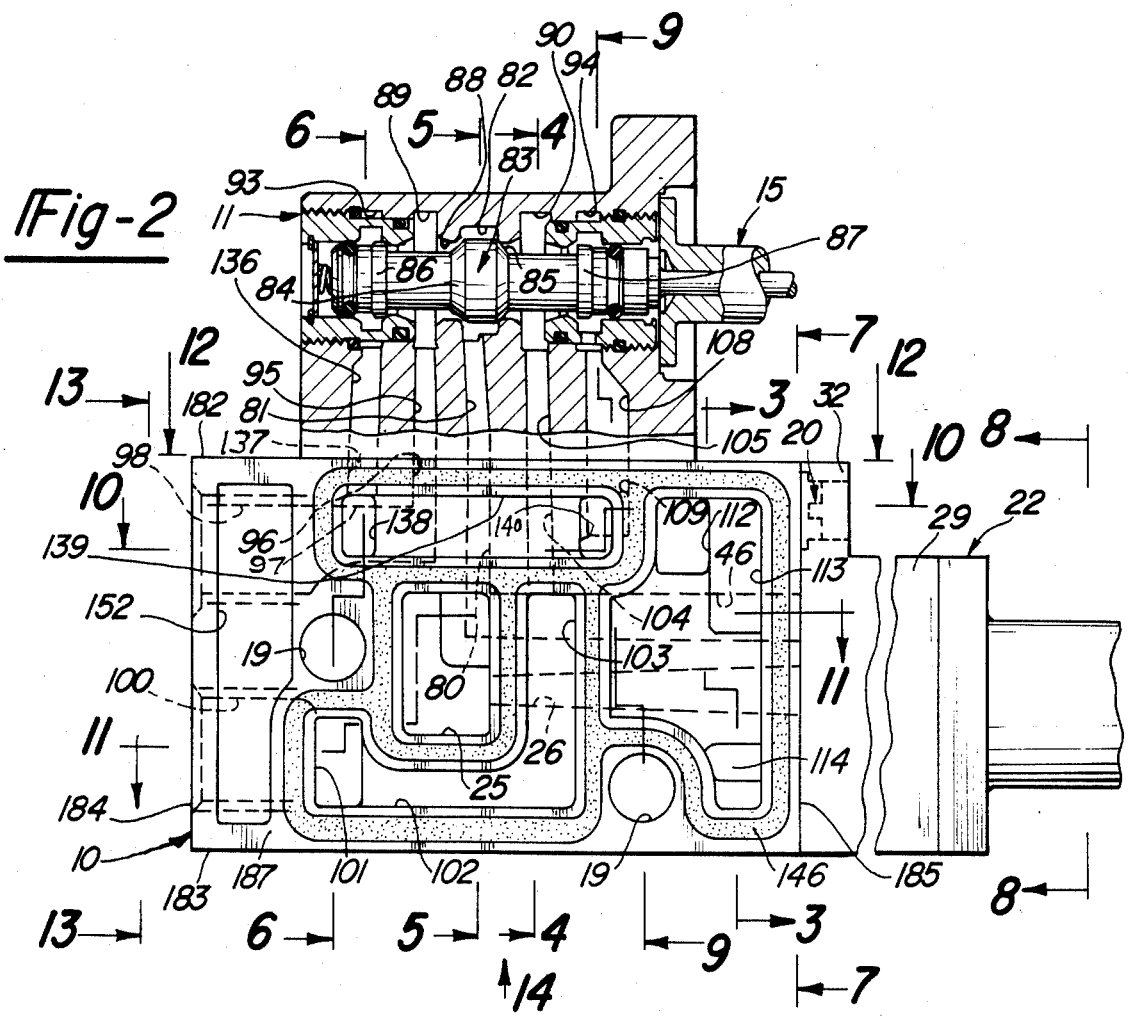
FIG. 2 is a side elevation view of a valve manifold stacking base made in accordance with the principles of the present invention, and showing a pressure regulator valve and a flow control valve means mounted thereon, and showing a four-way directional control valve, partly in section, mounted on the base.

The supply pressure inlet passages 24 in an end plate 17 or 17' communicates with one end of a common inlet supply pressure passage 25 which extends transversely through (FIG. 5) the adjacent manifold stacking base 10. As shown in FIG. 2, the common inlet passage 25, for the supply of primary pressurized air, communicates through a longitudinally extended inlet passage 26 which communicates at the right end of the manifold stacking base 10 with a chamber 27 (FIG. 7) formed in the right end surface or interface of the manifold stacking base 10, as viewed in FIG. 2.

Figure 18:
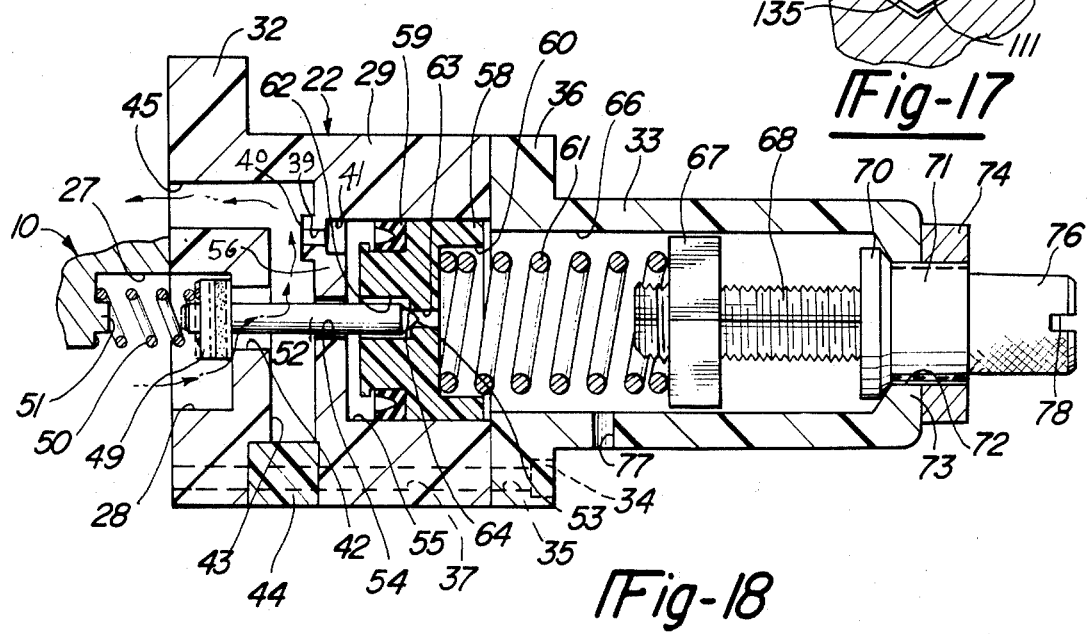
FIG. 18 is a longitudinal section view of a piston type regulator valve employed in the invention, taken substantially along the line 18—18 of FIG. 1, and looking in the direction of the arrows.

As shown in FIG. 18, the interface chamber 27 in the manifold stacking base 10 communicates with an inlet chamber 28 formed in the front end of the body 29 of the regulating pressure valve 22. The supply or primary pressurized air entering the end plate 17 is thus covered through the passages 24, 25 and 26 into the chamber 27 in the base 10, and thence into the communicating pressure regulator inlet chamber 28.

The pressure regulator valve body 29 has an integral flange 32 along the upper front end thereof. As shown in FIG. 18, the pressure regulator valve 22 is provided with a regulator spring housing 33, which is secured to the outer end of the pressure regulator valve housing 29 by a pair of suitable machine screws 34, which extend through bores 35 formed through an integral flange 36 on the front end of the spring housing 33, and thence through bores 37 formed through the pressure regulator valve body 29 and into threaded engagement with threaded bores 38 (FIG. 7) formed in the right end (as viewed in FIG. 2) of the manifold stacking base 10.

As shown in FIG. 18, the inlet chamber 28 in the pressure regulator valve housing 29 communicates through a longitudinally disposed inlet passage 42, with a transverse passage 43 for the regulated or secondary pressurized air. One end of the secondary pressure passage 43 is enclosed by a suitable plug 44. The other end of the secondary presure passage 43 communicates with a longitudinally extended secondary pressure passage 45, which opens at the front face of the front end of the pressure regulator valve body 29 and communicates with a longitudinally extended secondary pressure passage 46 (FIGS. 2, 7 and 11) in the adjacent manifold stacking base 10.

As shown in FIG. 18, the flow of primary pressure through the inlet passage 42 and into the secondary pressure passage 43 is controlled by a regulator poppet valve 49. The poppet valve 49 is urged into a seating or closed position over the outer end of the inlet passage 42 by a suitable spring 50. One end of the spring 50 is seated against the outer face of the poppet valve 49 and the other end is seated around a cylindrical guide pin 51 which is integrally formed on the inner wall of the base chamber 27 (FIG. 7) formed in the right end of the manifold stacking base 10. The poppet valve 49 is mounted on the outer end of an elongated shaft or pin 52. The inner end of the shaft 52 is conically shaped. The pin 52 extends inwardly through the inlet passage 42 and through the secondary pressure passage 43, and through an axial bore 54 which communicates with a piston chamber or cylinder 55. The diameter of the bore 54 is made to a size to provide a minimum or close tolerance clearance between the bore 54 and the pin 52, so that the bore 54 provides a guiding and supporting function for the poppet valve pin 52.

A bore 39 is formed through the wall 56 between the secondary pressure passage 43 and the piston cylinder 55. The bore 39 has one end communicating through a protrusion 40 with the secondary pressure passage 43. The other end of the bore 39 communicates through a recess 41 with the piston cylinder 55. The bore 39 is downstream from the bore 54. The bore 39 functions as a venturi, or pitot tube, so that when the poppet valve 49 opens, the air starts flowing through the passage 43, and a suction effect is created, which keeps the air in the piston cylinder 55 at a lower pressure. The air pressure does not go through the bore 39 into the piston cylinder 55. The air flowing past the bore 39 keeps the pressure in the piston cylinder 55 at a lower level than the pressure in the passage 43, so that when the poppet valve 49 opens, it opens quickly and stays fully open.

As shown in FIG. 18, a cylindrical regulator piston 58 is mounted in the piston cylinder 55. The regulator piston 58 is provided on the front end thereof with a suitable annular seal 59, and a cylindrical, axial, inwardly extended recess 60 on the rear end thereof. A regulator spring 61 has the inner end thereof seated in the recess 60 in the rear end of the regulator piston 58. An inwardly extended bore 62 is formed in the front end of the regulator piston 58, and its extends inwardly to a communication point with a reduced diameter bore 63. The bore 63 communicates with the recess 60 in the rear end of the regulator piston 58, and forms a secondary pressure bleed passage. The junction point formed by the shoulder between the bores 62 and 63 forms a valve seat 64. As shown in FIG. 18, the conical inner end 53 on the poppet valve pin 52 of the regulator valve member 49 is normally seated on the valve seat 64. It will be seen that the poppet valve pin 52 is supported at two points, namely, at the minimum clearance bore 54 and the valve seat 64.

As shown in FIG. 18, the regulator spring 61 is disposed in a spring chamber 66 in the spring housing 33. The outer end of the regulator spring 61 seats against the inner face of a spring pressure regulator nut 67, which is threadably mounted on a spring pressure regulator screw 68. As illustrated in FIG. 8, the inner pheriphery of the spring chamber 66 is hexagonal in cross section and mates with the hexagonal cross section outer surface of the nut 67. The complementary inner surface of the spring chamber 66 thus permits sliding engagement with the nut 67, but prevents the nut 67 from rotating in the chamber 66.

As illustrated in FIG. 18, the pressure regulator screw 68 is provided with an integral flange 70 on the outer end thereof, and with an integral shaft 71 which is rotatably mounted in an axial hole 72 formed through the end wall 73 of the spring body 33. A lock nut 74 is mounted on the shaft 71, and seats against the outer face of the spring housing wall 73. An adjustment knob 76 is integrally formed on the shaft 71 and it extends outwardly of the spring housing 33. The knob 76 is provided with a slot 78 for the reception of a tool to turn the screw 68 to adjust the pressure exerted by the regulator spring 61.

The regulator poppet valve 49 is shown in FIG. 18 in the normally closed position, and it opens on demand when secondary pressure is used to replace the reduced pressure. The regulator poppet valve 49 is moved to the open position by the regulating force applied on the regulator piston 58 by the regulator spring 61, which in turn is compressed to a desired regulating force position by the pressure regulating screw 68. The movement of the regulator piston 58 to the left, as viewed in FIG. 18, moves the regulator poppet valve pin 52 to move the regulator poppet valve 49 to the open position. The secondary pressure passes through the bore 39 and the minimum clearance between the bore 54 and the pin 52, and it works against the outer face of the regulator piston 58. As the secondary pressure increases against the pressure of the regulator spring 61, the regulator poppet valve 49 moves to the closed position shown in FIG. 18. The amount of the differential between the primary and secondary pressure depends upon the adjustment of the pressure on the regulator piston 58 by the regulator spring 61. When the regulator poppet valve 49 closes, the secondary pressure becomes a static pressure. However, when the directional control valve 11 is operated, the secondary pressure will be used, and a drop of the secondary pressure will be created in the secondary passage 43. The regulator spring 61 then moves the regulator piston 58 forwardly, that is to the left as viewed in FIG. 18, to move the regulator poppet valve 49 to the open position, to admit primary pressure into the passage 43 until the pre-set secondary pressure condition is again reached. When the desired or pre-set secondary pressure is again reached, the secondary pressure exerted on the front end of the regulator piston 58 will move it to the right, as viewed in FIG. 18, against the pressure of spring 61, to move the regulator poppet valve 49 back to the closed position.

If the secondary pressure in the passage 43 increases for some reason above the desired pre-set secondary pressure, the increased secondary pressure will pass through the bore 39 and the minimum clearance between the valve pin 52 and the bore 54, and move the regulator piston 58 to the right, as viewed in FIG. 18, to unseat the valve pin end 53 from the valve seat 64 and permit the increased or excess secondary pressure to be vented through the bleed passage 63 into the spring chamber 66, and thence out through the vent hole 77 until the pre-set secondary pressure is reached, at which time the regulator piston 58 will again move to the left, to again seat the conically shaped pin end 53 on the valve seat 64.

The piston type pressure regulator shown in FIG. 18 is a lightweight pressure regulator, due to its novel molded plastic construction. The only parts of the pressure regulator shown in FIG. 18 which are made of metal are the spring 50, the poppet valve pin 52, the spring 61, the nut 67, the screw 68, and the screw accessory parts 70-76. The regulator poppet valve 49 is made from a suitable elastomeric material. The pressure regulator housing 29, the plug 44, the spring housing 33 and the regulator piston 58 are each made from a suitable molded plastic material, such as "DELRIN". The making of the last mentioned regulator parts with the molded plastic material provides a lightweight pressure regulator, which is fast in operation, and which provides a fine and accurate control over the seating of the conically shaped pin end, or bleed valve 53, on the plastic seat 64, so that the opening and closing of the bleed passage 63 can be obtained instantly with movement of the piston 58, since there is no compression of the plastic molded material by the conically shaped pin end 53 when it seats on the plastic seat 64.

As best seen in FIGS. 2, 5 and 11, the flow of secondary pressurized air is conducted from the pressure regulator 22 through the longitudinal passage 46 and the vertical passage 80 in the manifold stacking base 10, and then upwardly into the passage 81 in the valve 11, and then into the valve inlet chamber 82 (FIG. 2). The illustrative valve 11 includes a conventional valve spool, generally indicated by the numeral 83, which is movably mounted in a conventional valve spool bore 88. The valve spool 83 is provided with a plurality of poppet valve elements 84-87 for controlling the flow of the secondary pressurized air from the inlet chamber 82 selectively into a first cylinder chamber 89 or a second cylinder chamber 90, and for selectively controlling the flow of exhaust air from said cylinder chambers to a pair of exhaust chambers 93 and 94.

The illustrative valve spool 83 is shown in FIG. 2 as being positioned to allow the flow of secondary pressure from the inlet chamber 82 into the first cylinder chamber 89, and to allow the second cylinder chamber 90 to be exhausted into the exhaust chamber 94. The exhaust chamber 93 is blocked by the poppet valve element 86. With the valve spool 83 in the last described position, secondary pressurized air is allow to pass from the inlet chamber 82 and through the valve spool bore 88 and into the first cylinder chamber 89, from whence it passes downwardly (FIG. 2) into a first cylinder passage 95 in the body of the valve 11. As shown in FIGS. 2 and 10, the first cylinder passage 95 in the valve 11 communicates with a vertical first cylinder passage 96 in the manifold stacking base 10. The passage 96 in the base 10 communicates with a horizontal passage 97, which in turn communicates with a first threaded cylinder port 98.

With the valve spool 83 in a first position shown in FIG. 2 the second cylinder threaded port 100 would be connected through the following passages to the exhaust chamber 94 in the valve 11. As shown in FIGS. 2 and 11, the second cylinder port 100 is connected at its inner end to a transverse passage 101. As shown in FIGS. 2 and 6, the transverse passage 101 communicates at its outer end with a longitudinally extended passage 102 along one side of the base 10. The passage 102 communicates at one end with the transverse passage 101, and at the other end with a vertical passage 103. Passageways 101-103 open to the exterior of the adjacent side of the base 10 but they are enclosed by a end plate or an adjacently disposed stacking valve 10, in accordance with the stacking arrangement in which it is incorporated. As shown in FIG. 4, the upper end of the vertical passage 103 communicates with the lower end of the passage 104 in the upper end of the base 10. The passage 104 in the base 10 communicates with the lower end of the vertical passage 105 in the valve 11, which in turn communicates with the second cylinder chamber 90 in the valve 11.

Figure 16:
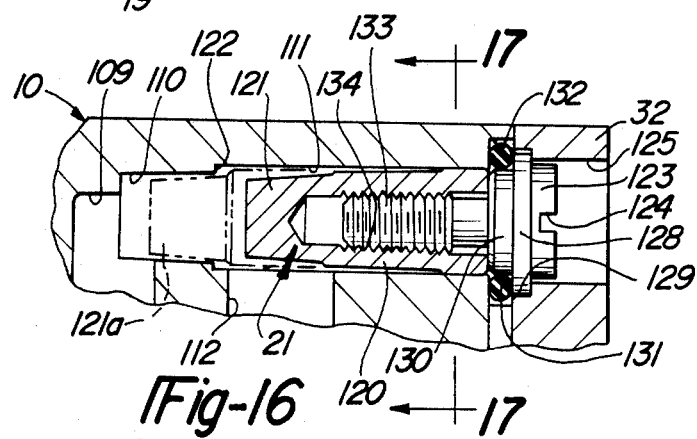
FIG. 16 is a fragmentary, elevation section view of the manifold stacking base structure illustrated in FIG. 8, taken along the line 16—16 thereof, looking in the direction of the arrows, and showing a flow control valve partially in cross section.

Pressurized air exhausting through the last described passages into the second cylinder chamber 90 is exhausted, when the valve spool 83 is in the position shown in FIG. 2, through the valve spool bore 88 and into the exhaust chamber 94. As best seen in FIGS. 2 and 9, the exhaust chamber 94 in the valve 11 is connected through a vertical passage 108 in the valve 11, which communicates at its lower end with the upper end of a vertical passage 109 in the base 10. As shown in FIGS. 9 and 10, the vertical passage 109 in the base 10 communicates with a horizontal, cylindrical bore 110. As shown in FIGS. 10 and 16, the bore 110 communicates with an axially disposed flow control valve chamber 111 which extends to the right end of the base 10.

As shown in FIG. 3, the flow control valve chamber 111 communicates with a transverse, horizontal exhaust passage 112, which in turn communicates with a vertical exhaust passage 113 that is formed along the front side of the base 10, as viewed in FIG. 2. As shown in FIG. 3 the lower end of the exhaust passage 113 communicates with a transverse exhaust passage 114 which passes through the lower end of the base 10 and forms a common exhaust passage, together with the lower end of the vertical exhaust passage 113. The end plates 17 and 17' are each provided with a threaded exhaust port 115 which communicates with the transverse exhaust passage 112 that is open on both sides of the base 10, as shown in FIG. 3.

Figure 17:
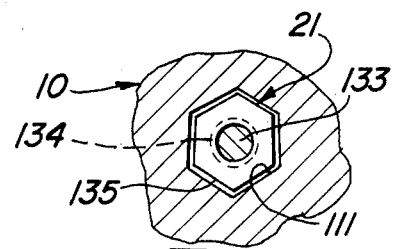
FIG. 17 is a fragmentary, elevation section view of the flow control valve structure illustrated in FIG. 16, taken along the line 17—17 thereof, and looking in the direction of the arrows.

As illustrated in FIGS. 8, 16 and 17, a flow control valve, generally indicated by the numeral 21, is operatively mounted in the flow control valve chamber 111. The flow of exhaust air from the valve exhaust chamber 94 to the exhaust port 115 in the end plate 17 may be controlled by the flow control valve 21. The flow control valve 21 has a body which is cylindrically shaped along the central and front end thereof, as indicated by the numeral 120 (FIG. 16). Integrally formed on the front end of the flow control valve body cylindrical portion 120 is a conically shaped valve 121, which is adapted to regulate the flow of fluid past a valve seat 122 that is formed at the junction point of the bore 110 and the inner end of the flow control valve chamber 111. As shown in FIG. 16, the flow control valve 21 is shown in a solid line, open position. The numeral 121a indicates a broken line, closed position of the flow control valve 121 when it is adjusted inwardly or to the left from its solid line, open position shown in FIG. 16.

The flow control valve 21 is a non-rising type valve, which has an adjustment control head 123 that remains stationary, longitudinally, when it is rotated for adjusting the position of the flow control valve 121. The cylindrical adjustment head 123 has a transverse slot 124 formed in the outer end face thereof, for rotating the adjustment head by means of a suitable tool. The adjustment head 123 is rotatably mounted in a bore 125 formed through the flange 32 on the regulator valve body 29.

As shown in FIG. 16, the cylindrical adjustment head 123 has integrally formed on the inner end thereof, an integral flange 128 which has a diameter larger than the diameter of the adjustment head 123. The integral flange 128 is rotatably seated in a bore 129, which is formed at the inner end of the bore 125, and which is formed to a larger diameter than the bore 125. The adjustment head 123 further includes an integral shaft portion 130 which has a smooth, outer periphery, and which is formed integrally on the inner side of the flange 128 to a diameter smaller than the outer diameter of the flange 128. The adjustment head shaft portion 130 has seated therearound a suitable O-ring seal 131 which is seated in an annular recess 132 formed in the outer face of the base 10. The recess 132 is formed to a diameter larger than the flange bore 129 in which the flange 128 is seated. As shown in FIG. 16, an elongated threaded adjustment screw shaft 133 is integrally formed on the inner side of the head shaft portion 130, and it is operatively mounted in a longitudinally extended threaded bore 134 which is formed in the rear end of the flow control valve body 120.

As shown in FIG. 17, the outer end of the flow control valve chamber 111 comprises a portion which is hexagonal in cross section. The rear end portion of the flow control valve body 120 is also provided with a circumferential, hexagonal shape so as to be slidably mounted in the hexagonal flow control valve chamber 111. It will be seen that when the flow control adjustment head 123 is rotated in one direction or the other, the threaded adjustment screw shaft 133 will remain in its longitudinaly position.

The turning of the threaded adjustment screw shaft 133 in the valve body threaded bore 134 causes the valve body 120 to move forwardly or backwardly, in a straight line action, without any rotation due to the sliding effect of the hexagonal rear end portion of the flow control valve body 120 in the hexagonal cross section portion of the flow control valve chamber 111. The positioning of the flow control valve 121 relative to the valve seat 122 is thus controlled by the last described parts of the non-rising type flow control valve 21.

As shown in FIG. 16, and longitudinal movement of the flow control adjustment head 123 is prevented by the flange 128, which is held in position against the transverse face of the bore 129 by the retaining action of the O-ring 131 which is seated in the O-ring annular recess 132.

The aforegoing describes the flow of secondary pressurized air through the manifold stacking base when the valve spool 83 of the illustrative valve 11 is in the first position shown in FIG. 2. The following describes the flow of secondary pressurized air and exhaust air through the modular stacking base 10 when the valve spool 83 of the illustrative valve 11 is moved from the first position shown in FIG. 2 to the left, or to a second position for the action of the solenoid 15.

In said second position, the valve spool 83 would be positioned to allow the flow secondary pressure from the inlet chamber 82 into the second cylinder chamber 90, and to allow the first cylinder chamber 89 to be exhausted into the exhaust chamber 93. The exhaust chamber 94 is then blocked by the poppet valve element 87. With the valve spool 83 in the last described second position, secondary pressurized air is allowed to pass from the inlet chamber 82 and through the valve spool bore 88 and into the second cylinder chamber 90, from whence it passes downwardly (FIG. 2) into the second cylinder passage 105 in the valve body 11. As previously described, the vertical passage 105 in the valve 11 communicates with the upper end of the vertical passage 104 in the base 10. The passage 104 in the base 10 communicates through the passages 103, 102 and 101 with the second cylinder port 100 (FIGS. 2, 4, 6 and 11).

The air entering the first cylinder port 98, and to be exhausted into the common exhaust passage 112, passes through the second cylinder port 98 and into the longitudinal passage 97 and thence into the vertical passage 96 (FIG. 10). As shown in FIG. 2, the passage 96 in the base 10 communicates with the lower end of the vertical passage 95 in the valve 11, which in turn communicates with the first cylinder chamber 89 in the valve 11. The air exhausted into the first cylinder chamber 89 through the last described passage from the first cylinder port 98 is then conducted through the valve spool bore 88 and into the exhaust chamber 93 in the valve 11. As shown in FIG. 6, the exhaust chamber 93 communicates with the upper end of a vertical exhaust passage 136 formed in the valve 11. The air exhausting through the passage 136 then passes downwardly into the vertical passage 137 in the base 10, and thence transversely into the communicating transverse passage 138. As shown in FIG. 10, the transverse passage 138 communicates with the longitudinal exhaust passage 139 (FIG. 2) which in turn communicates with a second transverse exhaust passage 140. As shown in FIGS. 9 and 10, the horizontal, transverse passage 140 communicates at its inner end with a horizontal, longitudinal, cylindrical bore 141. As shown in FIG. 10, the bore 141 communicates with an axially disposed flow control valve chamber 142 which extends to the right of the base 10 in a position parallel with the first described flow control valve chamber 111. As shown in FIG. 3, the flow control valve chamber 142 communicates with the aforedescribed common exhaust passage, comprising the passages 112-114.

As indicated in FIG. 8, a second control valve, generally indicated by the numeral 20, is operatively mounted in the flow control valve chamber 142. The flow control valve 20 is identical in structure and operation to the flow control valve 21, shown in detail in FIG. 16, and it is adapted to control the flow of exhaust air through the bore 141 and into the exhaust passage 112, in the same manner as the first described flow control valve 21.

As shown in FIG. 8, the flow control valve adjustment head 123 for the flow control valve 20 is operatively mounted in a stepped bore 143, 144, (FIG. 10), in the same manner as the flow control adjustment head 123 for the flow control valve 21, which is mounted in the stepped bore 125, 129 shown in FIG. 10. The flow control valve chamber 141 has an internal hexagonal peripheral shape, of the same form as the flow control chamber 111, for mating with the portion of the hexagonal shaped threaded adjustment screw 133 of the flow control valve 20.

The manifold stacking base 10 is preferably made from a die cast aluminum to provide a lightweight base. The end plates 17 are preferably made from a suitable die cast material, such as a die cast aluminum or zinc. As illustrated in FIGS. 2, 3-6, and 9-11, one side of the base 10 is provided with a seal member 146 which extends around the periphery of the aforedescribed passage through the base 10, and around the passage formed on the inner face sides of the base 10. The end plates 17 and 17' are provided with suitable seal members for sealing against the outer sides of the base 10, which are not provided with seal members 146. Seal members 146 in one base 10 would engage the side of the adjacent base 10 which is not provided with a seal member 146. Accordingly, it will be seen that every other member in a stack of the bases 10 would have seals on one side thereof, to be positioned against an unsealed side of an adjacent base 10 or end plate 17 or 17'.

The weight of the base 10 is reduced by providing recesses or openings in the side and bottom surfaces of the base 10. In FIG. 4, openings 148 are shown as being formed in the side surfaces of the base 10. In FIG. 5, the numeral 149 designates weight reducing openings or recesses in the side surfaces of the base 10. The numeral 150 in FIGS. 4, 5 and 14 designates a stepped recess in the bottom surface of the base 10. The numeral 151 in FIGS. 9 and 14 designates a weight reducing recess in the bottom end of the base 10. The numeral 152 in FIGS. 2, 10 and 11 designates weight reducing openings in the side surfaces of the base 10.

Figure 14:
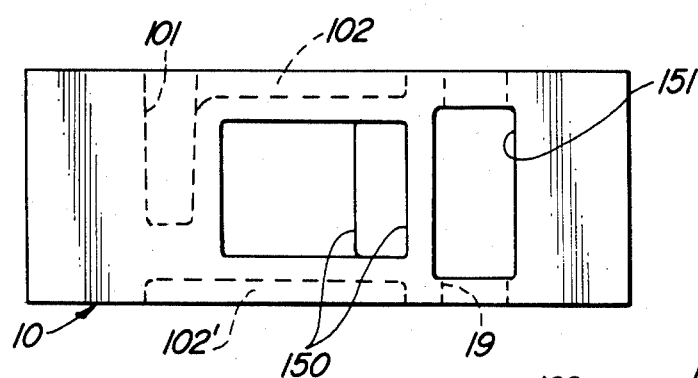
FIG. 14 is bottom plan view of the manifold stacking base structure illustrated in FIG. 2, taken in the direction of the arrow marked "14".
Figure 15:
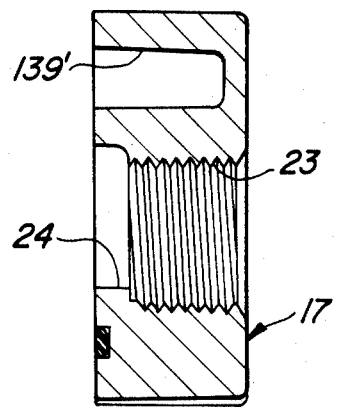
FIG. 15 is an elevation section view of the manifold stacking base end plate illustrated in FIG. 1, taken along the line 15—15 thereof, and looking in the direction of the arrows.

The description of the various flow passages through a stacking base 10, as set forth hereinbefore, includes many passages which are open at the side surfaces of the base 10. However, the open passages are enclosed by mating openings or recesses in a stacking adjacent base 10, in a stack of bases 10, or in an end plate 17 or 17'. For example, the passage 103, as shown in FIG. 4, would be enclosed by a recess or opening as 103', an example of which is shown on the left side of the base 10, as viewed in FIG. 4. A second stacking base 10 disposed on the right side of the base 10, as viewed in FIG. 4, would have an opening 103' positioned over the passage 103 for enclosing the same. If a third stacking base 10 is mounted on the left side of the base 10, as viewed in FIG. 4, then the recess 103' would enclose a passage 103 on the right side of the third stacking base 10, and so forth. FIG. 6 shows a complementary recess 101' for a recess 101, which it would enclose on an adjacent stacking base 10 mounted on the left side of the base 10 shown in the FIG. 6. The complementary recess 101' and passage 101 is also shown in FIG. 11. FIG. 11 also illustrates complementary recesses 103' and 113' for mating with passages 101 and 103 in an adjacent stacking base 10. FIG. 9 illustrates complementary recesses 113' and 140' which would mate with recesses 113 and 140 in an adjacent stacking base 10. FIG. 14 shows a complementary recess 102' which would mate with a passage 102 in an adjacent stacking base 10. The numeral 139' in FIGS. 10 and 15 designates a recess which mates with a recess 139 in an adjacent stacking base 10. FIG. 15 shows a complementary recess 139 in the right end plate 17 which mates with a passage 139 in an adjacent stacking base 10. As shown in FIG. 25, the right end plate 17 is provided with complementary recesses 25', 101', 102', 103', 114' and 139' which mate with the corresponding numbered passages in the side or interface of a stacking base 10. The left end plate 17' may be provided with the same recesses as shown in FIG. 25, but in a reverse position, as viewed from the left side of the stack of bases 10 and the end plates 17 and 17' in FIG. 1.

In use, it will be seen that the modular stacking base 10 of the present invention provides a pressure regulator function and a flow control function for a directional control valve, as the illustrative valve 11. The pressure regulator and flow control functions are integrated with functions of a manifold stacking base 10. The manifold stacking base 10 of the present invention provides a simple manifold stacking base structure which is compact and light in weight, and which provides the pressure regulator and flow control functions at reduced costs, when compared with a prior art base with a sandwich plate between it and a directional control valve, in order to provide pressure regulator and flow control functions.

FIG. 19 illustrates a diaphragm type pressure regulator 22a which may be employed with the manifold stacking base 10 of the present invention. The parts of the pressure regulator 22a illustrated in FIG. 19 which are the same as the corresponding parts of the piston type pressure regulator 22 illustrated in FIG. 18 have been marked with the same reference numerals followed by the small letter "a".

In the pressure regulator 22a illustrated in FIG. 19, the adjustment screw 68a is provided on its outer end with an integral flange 155 which has a conical outer peripheral edge 156 that seats on a conical shoulder 157 formed on the regulator spring housing end wall 73a. The adjustment screw 68a is further provided with an adjustment knob 158 which is integrally formed on the outer end of the flange conical side or end surface 156, and which extends through the bore 72a in the regulator spring housing end wall 73a. The adjustment knob 158 is provided with a slot 161 for the insertion of a suitable tool for turning the adjustment screw 68a. The screw 68a is held in a longitudinal position by means of a retainer ring 160 which is positioned around the outer end of the adjustment knob 158 that extends outwardly of the regulator spring housing 33a and seats against the outer side of the spring housing end wall 73a.

As shown in FIG. 19, a cylindrically shaped diaphragm chamber 162 is formed partially in the rear end of the regulator body 29a and partially in the spring housing 33a. A flat, circular, diaphragm 163, is mounted in a circular recess 164 formed in the rear end of the regulator body 29a. The outer periphery of the diaphragm 163 seats against the end wall 165 formed at the inner end of the circular recess 164. The diaphragm 163 is held in position against the end wall 165 by a cylindrical extension 166 which is integrally formed on the front end of the spring housing flange 36a.

The diaphragm 163 is provided with an axial opening 170 through which is mounted a shaft 171 that is integrally formed on the rear side of a circular diaphragm carrier plate 172. The diaphragm 163 is held against the rear side of the diaphragm carrier plate 172 by a retainer plate 173. The retainer plate 173 has an axial opening 174 through which is received the shaft 171. The retainer plate 173 has an integral, cylindrical, axially extended flange 175. The free end of the shaft 171 is peened (176) over the outer face of the retainer plate 173 for clamping the diaphragm 163 between the carrier plate 172 and the retainer plate 173.

The diaphragm type pressure regulator 22a illustrated in FIG. 19 functions in the same manner as described hereinbefore, in the description of the piston type diaphragm shown in FIG. 18. If the secondary pressure in the passage 43a increases for some reason above the desired pre-set secondary pressure, the increased secondary pressure will pass through the bore 39a and the minimum clearance between the valve pin 52a and the bore 54a and into the diaphragm chamber 162. The increased secondary pressure in the diaphragm chamber 162 will move the plate 172 to the right as viewed in FIG. 19, and the diaphragm 163 will be flexed, and the combination structure of the carrier plate 172 and the diaphragm 163 will move to the right, as viewed in FIG. 19, and move the valve seat 54a off of the conical end 53a on the valve pin 52a, to permit the excess secondary pressure to bleed through the bore 63a and into the spring chamber 66a, and thence out to the atmosphere through the vent bore 77a in the spring housing 33a. When the pre-set secondary pressure is reached, the regulator spring 61a will move the carrier plate 172 and the diaphragm 163 back to the normal position with the conical pin end 53a seated against the valve seat 54a.

The diaphragm 163 is made from a suitable elastomeric material. The diaphragm carrier plate 172 and the retainer plate 173 may each be made from a suitable metal, however, preferably, they are made from a suitable molded plastic material such as "DELRIN". The other parts of the pressure regulator illustrated in FIG. 19, are made from the same materials as stated hereinbefore for the piston type pressure regulator illustrated in FIG. 18. The diaphragm type pressure regulator illustrated in FIG. 19 functions in the same manner, to regulate the secondary pressure, as set forth hereinbefore and described under the description of the piston type pressure regulator shown in FIG. 18.

A novel feature of the manifold stacking base 10 of the present invention is that it can be employed to provide a pressure regulating function to the supply of pressurized air for a valve, as well as a flow control function for one or both ends of an air cylinder controlled by a four-way direction control valve mounted on the base 10. The base 10 can also be used without providing the pressure regulating function and the flow control function, or it can be used to provide the pressure regulating function without a flow control function, or vice versa.

FIGS. 20 and 21 illustrate the use of a base 10 without providing a pressure regulating function and a flow control function. When it is desired to use the base 10 without pressure regulating and flow control functions, a closure plate 178 is mounted on the right end of the base 10, as viewed in FIG. 2, and it is held on the base 10 by the screws 34b. A vertically disposed recess or channel 179 is formed in the inside surface of the plate 178. The channel 179 forms a passage for connecting the inlet pressure chamber 27 in the base 10 with the passage 46 in the base 10. With the employment of the closure plate 178, it will be seen that the inlet pressurized air will flow from the inlet port 23 into the inlet pressure chamber 82 in the valve 11.

FIGS. 22 and 23 illustrate the use of a base 10 with the provision of a pressure regulator function without a flow control function. In the modification shown in FIGS. 22 and 23, the flow control valves 20 and 21 are deleted, and a pair of circular dummy plugs 180 are mounted in the bores 129 and recesses 132 (FIG. 16), which normally house the flange 128 and the shaft portion 130 of the flow control adjustment head 123 (FIG. 16). As illustrated in FIG. 23, the dummy plugs 180 have a T-shaped cross section, which is identical to the shape of the combined shape of the adjustment flange 128 and the shaft portion 130, and they are sealed O-rings 131 seated in the recesses 132.

FIG. 24 illustrates the use of a base 10 with the provision of a flow control function without a pressure regulator function. In the embodiment illustrated in FIG. 24, an end plate 178c would be operatively mounted on the right end of a base 10, as viewed in FIG. 2, by means of the usual machine screws 34c. The plate 178c would be provided with a channel 179c for connecting the inlet pressure chamber 27 (FIG. 7) and the passage 46 in the base 10, in the same manner as in the embodiment of FIGS. 20 and 21. The plate 178c would be provided with the a pair of openings 125c and 143c for mounting the adjustment heads 123 of a pair of flow control valves 20c and 21c, which would be functionally and structurally the same as the flow control valves 20 and 21 employed in the first described embodiment.

In the following claims the terms top, bottom, side and end surfaces have been employed, and they are indicated in FIGS. 2, 12, and 13 by the numerals 182, 183, 184, 185, 186 and 187, respectively. As viewed in FIG. 12, the upper end of the inlet pressure passage 80 forms a supply or inlet pressure port at the top surface 182 of the base 10. As shown in FIG. 12, the upper ends of the passages 96 and 104 form valve supply and return ports in the top surface 182 of the base 10. As shown in FIG. 12, the upper ends of the passages 137 and 109 form exhaust ports in the top surface 182 of the base 10.

It will be seen from the aforegoing description of base 10 that the inlet pressure passage is formed entirely within the base 10, with the exception of the portion that communicates from the recess 27 through either one of the closure plate 178 or 178c, or through either the passage through the piston type pressure regulator 22 or the passage through the daiphragm type pressure regulator 22a, and thence back into the inlet passage 46 in the base 10. It will also be seen that the supply and return passage means in the base 10 for the first valve chamber 89 in the valve 11 is formed wholly in the base 10, while the supply and return passage means for the other cylinder chamber 90 in the valve 11 is formed wholly through the base 10 with a portion of this passage means 101–103 being open at the right side or interface 187. The exhaust passage means in the base 10 for the exhaust chamber 94 is the valve 11 is formed wholly through the base 10, while the exhaust passage means in the base 10 for the exhaust chamber 93 in the valve 11 is formed partially through the middle portion of the base 10 and an open portion 139 is formed in the interface side 187. It will be understood that the portions of the aforementioned passages which open to one or the other of the interfaces on the base 10 is enclosed by complementary openings on the adjacent side of a stacked like base 10, or one of the end plates 17 or 17'. It will also be understood that the open portions of the aforementioned passages in the interface or side faces 186 and 187 of the base 10 may also be enclosed by any flat faced plate and the passage would still be operative.

What is claimed is:

1. A manifold stacking base for a fluid pressure valve system, characterized by:
   (a) said base having a rectangular configuration with top, bottom, side and end surfaces;
   (b) said side surfaces being adapted for abutting the side surfaces of like bases and stacking end plates, each end plate having an inlet pressure port and an exhaust port;
   (c) said base including an enclosure means detachably mounted on one of the end surfaces;
   (d) said base having a common inlet pressure passage extending therethrough from side to side adapted to communicate with a common inlet pressure passage in an adjacent stacking member;
   (e) said base having a common exhaust passage extending therethrough from side to side adapted to communicate with a common exhaust passage in an adjacent stacking member;
   (f) a pressure port, a first valve supply and return port and a second valve supply and return port, and a pair of exhaust ports formed in said top surface of said base;
   (g) pressure passage means in said base communicating said common inlet pressure passage with said pressure port in said top surface;
   (h) a pair of exhaust passage means in said base communicating said common exhaust passage with said pair of exhaust ports in said top surface of said base;
   (i) a first cylinder port and a second cylinder port formed in the other of the end surfaces of said base and comprising fluid device supply and return ports;
   (j) supply and return passage means in said base communicating said fluid device supply and return ports in said other end surface of said base with the first and second valve supply and return ports in said top surface of said base;
   (k) said top surface being adapted to abut a surface of a fluid pressure valve with the inlet pressure, exhaust, and valve supply and return ports in said top surface of said base in registry with the inlet pressure, exhaust, and valve supply and return passages with the fluid pressure valve;
   (l) a portion of said pressure passage means is formed through said enclosure means mounted on said one end surface;
   (m) portions of said pair of exhaust passage means in said base communicating said common exhaust passage with said pair of exhaust ports in said top surface of said base are partially formed in one of the interface sides of the base and are open to the exterior thereof and are enclosed by an adjacent stacking member;
   (n) said supply and return passage means in said base comprises a pair of supply and return passages wherein one of said supply and return passages is formed wholly in said base and connects one of said fluid device supply and return ports to one of the valve supply and return ports in said top surface of the base; and,
   (o) the other of said supply and return passages for communicating the other of said fluid device supply and return ports to the other of said valve supply and return ports in said top surface of said base is formed partially in one of the interface sides of the base and is open to the exterior thereof and is enclosed by an adjacent stacking member.

2. A manifold stacking base for a fluid pressure valve system, as defined in claim 1, characterized by:
   (a) said enclosure means comprises a pressure regulator means mounted on said one end surface of said base for regulating the inlet pressure from said common inlet pressure passage and providing a regulated secondary pressure for conduction to the pressure port formed in said top surface of said base.

3. A manifold stacking base for a fluid pressure valve system, as defined in claim 2, characterized by:
   (a) said pressure regulator means comprises a piston type pressure regulator valve.

4. A manifold stacking base for a fluid pressure valve system, as defined in claim 2, characterized by:
   (a) said pressure regulator means comprises a diaphragm type pressure regulator valve.

5. A manifold stacking base for a fluid pressure valve system, as defined in claim 1, characterized by:
   (a) a flow control valve means is operatively mounted in at least one of said pair of exhaust passage means in said base communicating said common exhaust passage with said pair of exhaust ports in said top surface of said base, and it has an adjustment head extending outwardly of said base for adjusting the flow control position of the flow control valve means.

6. A manifold stacking base for a fluid pressure valve system, as defined in claim 5, characterized by:
   (a) said enclosure means comprises a pressure regulator means mounted on said one end surface of said base for regulating the inlet pressure from said common inlet pressure passage and providing a regulated secondary pressure for conduction to the pressure port formed in said top surface of said base.

7. A manifold stacking base for a fluid pressure valve system, as defined in claim 5, characterized by:
   (a) said enclosure means mounted on said one end surface of said base comprises a plate detachably mounted on said one end surface of the base, and the adjustment head of said flow control valve means extends through an opening in the plate for access to the adjustment head.

8. A manifold stacking base for a fluid pressure valve system, as defined in claim 1, characterized by:
   (a) a flow control valve means is operatively mounted in each of said pair of exhaust passage means in said base communicating said common exhaust passage with said pair of exhaust ports in said top surface of said base, and each flow control valve means has an adjustment head extending outwardly of said base for adjusting the flow control valve means.

9. A manifold stacking base for a fluid pressure valve system, as defined in claim 8, characterized by:
   (a) said enclosure means comprises a pressure regulator means mounted on said one end surface of said base for regulating the inlet pressure from said common inlet pressure passage and providing a regulated secondary pressure for conduction to the pressure port formed in said top surface of said base.

10. A manifold stacking base for a fluid pressure valve system, dependent from claim 9, characterized by:
    (a) said pressure regulator means includes a flange mounted on said one end of said base and provided with openings therethrough for access to the adjustment heads of the flow control valve means for adjusting the flow control valve means.

11. A manifold stacking base for fluid pressure valve system, as defined in claim 1, characterized by:
    (a) said enclosure means mounted on said one end surface of said base comprises a plate detachably mounted on said one end surface of said base and having a passage formed on the inner surface thereof to form a portion of said pressure passage means.

* * * * *